United States Patent
Wu et al.

(10) Patent No.: US 10,069,450 B2
(45) Date of Patent: Sep. 4, 2018

(54) BLDC MOTOR

(71) Applicant: Johnson Electric S.A., Murten (CH)

(72) Inventors: Kai Wu, Shenzhen (CN); Xia Chen, Shenzhen (CN); Rui Feng Qin, Hong Kong (CN)

(73) Assignee: Johnson Electric S.A., Murten (CH)

( * ) Notice: Subject to any disclaimer, the term of this patent is extended or adjusted under 35 U.S.C. 154(b) by 453 days.

(21) Appl. No.: 14/959,842

(22) Filed: Dec. 4, 2015

(65) Prior Publication Data

US 2016/0164447 A1 Jun. 9, 2016

(30) Foreign Application Priority Data

Dec. 4, 2014 (CN) .......................... 2014 1 0734454

(51) Int. Cl.
*H02K 7/20* (2006.01)
*H02P 25/22* (2006.01)
*B62D 5/04* (2006.01)
*H02P 29/032* (2016.01)

(52) U.S. Cl.
CPC ............ *H02P 25/22* (2013.01); *B62D 5/0421* (2013.01); *H02P 29/032* (2016.02)

(58) Field of Classification Search
CPC ...... H02P 25/22; H02P 29/032; B62D 5/0421
USPC .................................................. 310/112–114
See application file for complete search history.

(56) References Cited

U.S. PATENT DOCUMENTS

| 4,476,395 | A | * | 10/1984 | Cronin | ................... H02K 16/00 290/4 C |
| 6,203,116 | B1 | * | 3/2001 | Dieckmann | ............. B60T 8/885 303/122 |
| 9,203,290 | B2 | * | 12/2015 | Roesmann | ............ F03D 7/0224 |
| 2011/0095603 | A1 | * | 4/2011 | Lee | ..................... B60L 11/1803 307/10.1 |

* cited by examiner

*Primary Examiner* — Thanh Lam
(74) *Attorney, Agent, or Firm* — Muncy, Geissler, Olds & Lowe, P.C.

(57) ABSTRACT

A BLDC motor, has a first sub-motor and a second sub-motor. The first and second sub-motors have independent input terminals and a common rotor, including a common output shaft. In a normal operating mode the two sub-motors operate together as one motor to output a normal operating power of the motor. In an emergency operating mode, when one sub-motor has become faulty and generates a braking torque, the normal sub-motor is operated to generate a torque to compensate for the braking torque produced by the faulty sub-motor.

20 Claims, 11 Drawing Sheets

BLDC MOTOR

CROSS REFERENCE TO RELATED APPLICATIONS

This non-provisional patent application claims priority under 35 U.S.C. § 119(a) from Patent Application No. 201410734454.1 filed in The People's Republic of China on Dec. 4, 2014, the entire contents of which are hereby incorporated by reference.

FIELD OF THE INVENTION

This invention relates to a brushless direct current (BLDC) motor and in particular, to a BLDC motor having dual stators and a method of controlling such a motor.

BACKGROUND OF THE INVENTION

A BLDC motor includes a stator having windings, a rotor having a permanent magnet and a controller for supplying power to the stator. A conventional BLDC motor generally includes a set of m-phase input terminals, each of which is configured to input a current to m phase windings of the stator. The conventional BLDC motor has a defect: the motor breaks down totally when the conventional BLDC motor fails, the motor cannot drive a load efficiently, and even may generate an oscillating braking torque. For example, in an electric power steering system of a vehicle, if the BLDC motor develops a short circuit in a winding or control switch, not only does in lose power but it may generate a braking torque significantly increasing the load on the motor. In a serious case, the oscillating brake torque generated by the BLDC motor affects the steering wheel, which prevents a driver from controlling the direction of the vehicle, and thus may cause an accident.

SUMMARY OF THE INVENTION

Hence there is a desire for a an improved technical solution.

Accordingly, in one aspect thereof, the present invention provides a BLDC motor, comprising: a first sub-motor and a second sub-motor, wherein the first sub-motor and the second sub-motor have independent input terminals and a common output shaft, a normal operating mode and an emergency operating mode are set for the first sub-motor and the second sub-motor; wherein, in the normal operating mode, the two sub-motors operate together as one motor to output a normal operating power of the brushless DC motor; and a normal sub-motor starts operating in the emergency operating mode when one of the two sub-motors becomes faulty and generates a braking torque, and a phase current waveform of the normal sub-motor in the emergency operating mode is different from a phase current waveform of the normal sub-motor in the normal operating mode.

Preferably, a torque output from the normal sub-motor in the emergency operating mode compensates for the braking torque generated by the faulty sub-motor, and a positive and smooth resultant torque is obtained.

Preferably, a phase current $i_q$ of the normal sub-motor is obtained according to the formula $i_q = -T/K_t$, wherein T is a torque output from the faulty sub-motor, and $K_t$ is a torque constant of the normal sub-motor.

Preferably, the first sub-motor and the second sub-motor are three-phase motors, and the fault is a fault in which two phase windings of the faulty sub-motor are shorted.

Preferably, the torque T output from the faulty sub-motor is obtained according to the following formula:

$$\begin{cases} (L_a + L_b)\dfrac{di}{dt} + (R_a + R_b)i = e_b - e_a \\ T = \dfrac{e_a i_a + e_b i_b + e_c i_c}{\omega} = \dfrac{e_a - e_b}{\omega} i \end{cases}.$$

Alternatively, the fault is a fault in which three of the phase windings of the faulty sub-motor are shorted.

In this case the torque T output from the faulty sub-motor is obtained according to the following formula:

$$\begin{cases} (L_a + L_b)\dfrac{di_1}{dt} + (R_a + R_b)i_1 = e_b - e_a \\ (L_c + L_b)\dfrac{di_2}{dt} + (R_c + R_b)i_2 = e_b - e_c \\ (L_a + L_c)\dfrac{di_3}{dt} + (R_a + R_c)i_3 = e_c - e_a \\ T = \dfrac{e_a i_a + e_b i_b + e_c i_c}{\omega} = \dfrac{e_a(i_1 + i_3) - e_b(i_1 + i_2) + e_c(i_3 - i_2)}{\omega} \end{cases}$$

Alternatively, at least one controller is connected to input terminals of the first sub-motor and the second sub-motor via switching elements, and the fault is a fault in which at least one of the switching elements is shorted.

In this case the torque T output from the faulty sub-motor is obtained according to the following formula:

$$T = \dfrac{e_a i_a + e_b i_b + e_c i_c}{\omega} = \dfrac{-e_a(i_1 + i_2) + e_b i_1 + e_c i_2}{\omega}, \text{ wherein}$$

$$\begin{cases} \text{if } (e_a > e_b), (L_a + L_b)\dfrac{di_1}{dt} + (R_a + R_b)i_1 = e_a - e_b; \text{ else, } i_1 = 0 \\ \text{if } (e_a > e_c), (L_a + L_c)\dfrac{di_2}{dt} + (R_a + R_c)i_2 = e_a - e_c; \text{ else, } i_2 = 0 \end{cases}.$$

Preferably, the first sub-motor and the second sub-motor each comprise several teeth and windings, and the teeth of the first sub-motor and the teeth of the second sub-motor are staggered in a circumferential direction.

Preferably, the teeth of the first sub-motor and the teeth of the second sub-motor are uniformly staggered in a circumferential direction.

Preferably, the number of stator slots of the brushless DC motor is twelve, the first sub-motor and the second sub-motor each comprise six teeth, the six teeth comprises two U phase teeth, two V phase teeth and two W phase teeth, and two teeth in the same phase are symmetrically distributed by 180 degrees.

Alternatively, the first sub-motor and the second sub-motor each comprise several teeth and windings, and the teeth of the first sub-motor and the teeth of the second sub-motor are arranged in parallel in an axial direction.

According to a second aspect, the present invention provides an electric power steering system, comprising: a steering wheel, a steering column fixedly connected to the steering wheel, a steering gear fixedly connected to the steering column, and a motor drivingly connected to the steering gear, wherein the motor is a BLDC motor as described above.

According to a further aspect, the present invention provides a method for controlling a BLDC motor, wherein the brushless DC motor comprises a first sub-motor and a second sub-motor, the first sub-motor and the second sub-motor have independent input terminals and a common output shaft, the method comprises the steps of: setting the first sub-motor and the second sub-motor to be capable of operating together as one motor, or operating independently; setting a normal operating mode for the first sub-motor and the second sub-motor, wherein the two sub-motors operate together as one motor to output a normal operation torque of the brushless DC motor in the normal operating mode; and setting an emergency operating mode for the first sub-motor and the second sub-motor, wherein a normal sub-motor starts operating in the emergency operating mode when one of the two sub-motors becomes faulty and generates a braking torque, a phase current waveform of the normal sub-motor in the emergency operating mode is different from a phase current waveform of the normal sub-motor in the normal operating mode, and a torque output from the normal sub-motor in the emergency operating mode compensates for the braking torque generated by the faulty sub-motor.

Preferably, a positive and smooth torque waveform is generated by combining the torque output from the normal sub-motor and the torque output from the faulty sub-motor.

Preferably, a phase current $i_q$ of the normal sub-motor is obtained according to the formula $i_q = -T/K_t$, wherein T is a torque output from the faulty sub-motor, and $K_t$ is a torque constant of the normal sub-motor.

Preferably, the first sub-motor and the second sub-motor are three-phase motors, and the fault is a fault in which two phase windings of the faulty sub-motor are shorted, and the torque T output from the faulty sub-motor is obtained according to the following formula:

$$\begin{cases} (L_a + L_b)\dfrac{di}{dt} + (R_a + R_b)i = e_b - e_a \\ T = \dfrac{e_a i_a + e_b i_b + e_c i_c}{\omega} = \dfrac{e_a - e_b}{\omega}i \end{cases}.$$

Alternatively, the first sub-motor and the second sub-motor are three-phase motors, and the fault is a fault in which three phase windings of the faulty sub-motor are shorted, and the torque T output from the faulty sub-motor is obtained according to the following formula:

$$\begin{cases} (L_a + L_b)\dfrac{di_1}{dt} + (R_a + R_b)i_1 = e_b - e_a \\ (L_c + L_b)\dfrac{di_2}{dt} + (R_c + R_b)i_2 = e_b - e_c \\ (L_a + L_c)\dfrac{di_3}{dt} + (R_a + R_c)i_3 = e_c - e_a \\ T = \dfrac{e_a i_a + e_b i_b + e_c i_c}{\omega} = \dfrac{e_a(i_1 + i_3) - e_b(i_1 + i_2) + e_c(i_3 - i_2)}{\omega} \end{cases}.$$

Alternatively, at least one controller is connected to input terminals of the first sub-motor and the second sub-motor via switching elements, the fault is a fault in which at least one of the switching elements is shorted, and the torque T output from the faulty sub-motor is obtained according to the following formula:

$$T = \dfrac{e_a i_a + e_b i_b + e_c i_c}{\omega} = \dfrac{-e_a(i_1 + i_2) + e_b i_1 + e_c i_2}{\omega}, \text{ wherein}$$

$$\begin{cases} \text{if } (e_a > e_b),\ (L_a + L_b)\dfrac{di_1}{dt} + (R_a + R_b)i_1 = e_a - e_b;\ \text{else},\ i_1 = 0 \\ \text{if } (e_a > e_c),\ (L_a + L_c)\dfrac{di_2}{dt} + (R_a + R_c)i_2 = e_a - e_c;\ \text{else},\ i_2 = 0 \end{cases}.$$

In view of this, a BLDC motor includes a first sub-motor and a second sub-motor, the first sub-motor and the second sub-motor have independent input terminals and a common output shaft. Normal operating mode and an emergency operating mode are set for the first sub-motor and the second sub-motor. In the normal operating mode, two sub-motors operate together as one motor. The motor switches over to the emergency operating mode when one of the sub-motors becomes faulty. In the emergency operating mode the normal sub-motor is operated to provide a torque which compensates for the braking torque generated by the faulty sub-motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
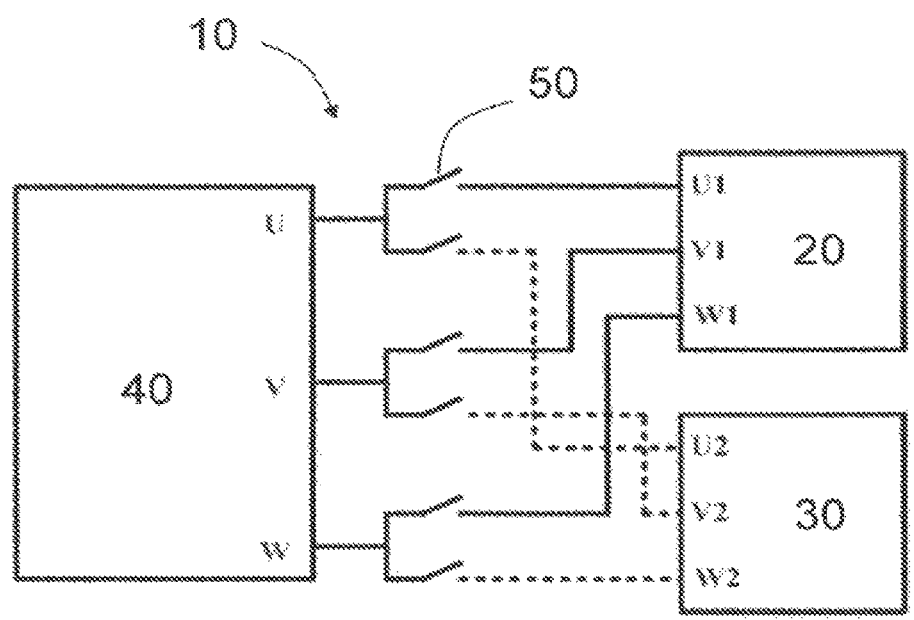
FIG. 1 is a schematic block diagram of a brushless DC motor according to the present invention.

Referring to FIG. 1, a brushless DC motor 10 according to the present invention includes a first sub-motor 20, a second sub-motor 30 and a controller 40 for controlling the first sub-motor 20 and the second sub-motor 30. The same rotor and shaft are shared by the two sub-motors and torque is output via the shaft.

The brushless DC motor 10 according to the embodiment is a three-phase motor. The first sub-motor 20 includes three input terminals U1, V1 and W1, and the second sub-motor 30 includes three input terminals U2, V2 and W2. The input terminals of the first sub-motor 20 are independent from the input terminals of the second sub-motor 30. The controller 40 is connected to the input terminals of the sub-motor 20 and the input terminals of the sub-motor 30 via switch units 50 respectively. Hence, the first sub-motor 20 and the second sub-motor 30 may operate together as one motor or may operate independently.

Figure 2:
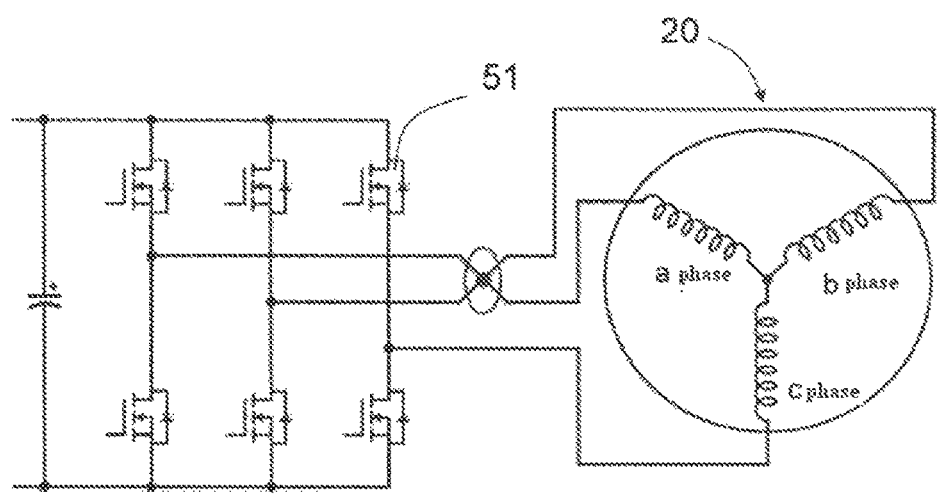
FIG. 2 shows a situation in which two phase windings of a first sub-motor of the brushless DC motor as shown in FIG. 1 are shorted.
Figure 6:
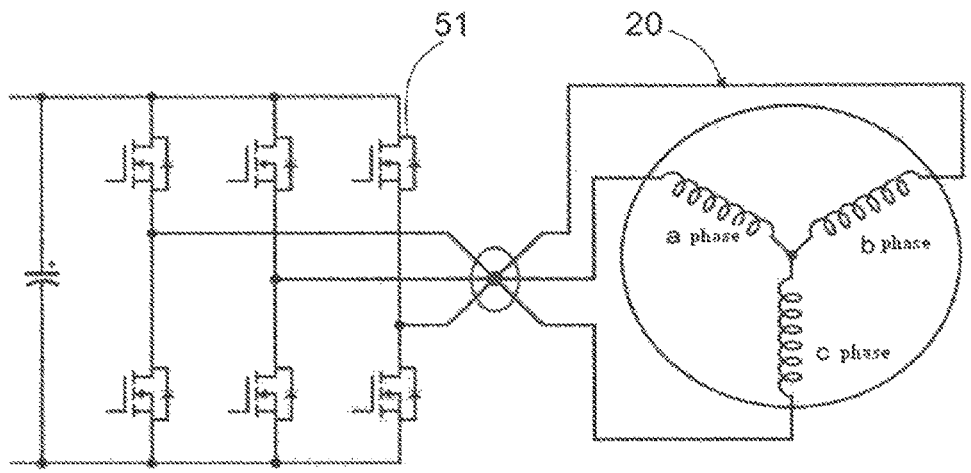
FIG. 6 shows a situation in which three phase windings of a first sub-motor of the brushless DC motor as shown in FIG. 1 is shorted.
Figure 10:
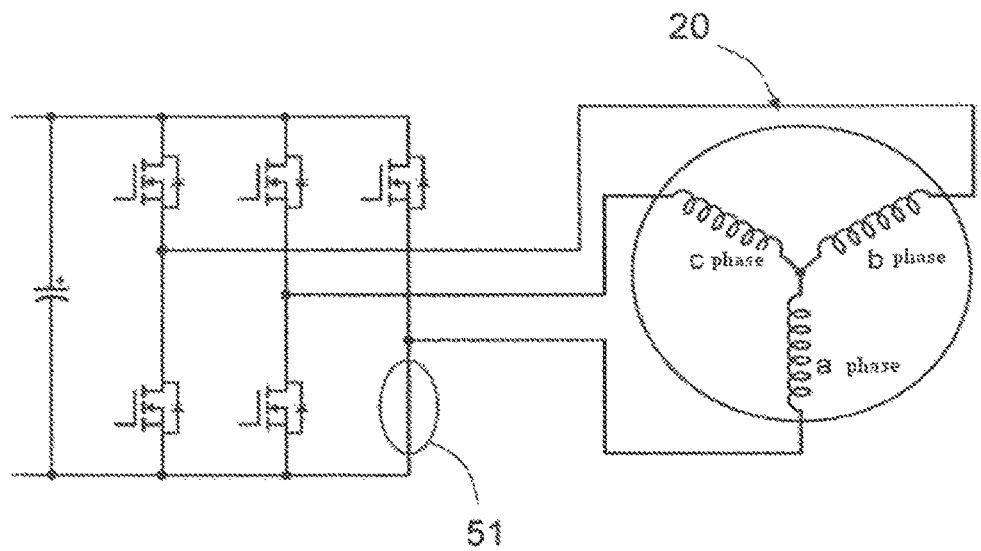
FIG. 10 shows a situation in which one of switching elements by which a controller is connected to a first sub-motor is shorted in the brushless DC motor.

It is to be noted that FIG. 1 is merely a schematic block diagram rather than a specific circuit connection diagram. In FIG. 1, the controller 40 is connected to each of the input terminals of the motor 10 via one switch unit 50. In fact, each switch unit 50 may be implemented with two switching elements 51 in an actual circuit, as shown in FIGS. 2, 6 and 10. Hence, it should be understood that, each switch unit 50 shown in FIG. 1 includes two switching elements 51. Preferably, the switching element 51 may be a MOS transistor, a bipolar transistor or an Insulated Gate Bipolar Transistor (IGBT).

Under the control of the controller 40, a normal operating mode and an emergency operating mode are set for both the first sub-motor 20 and the second sub-motor 30. In the normal operating mode, the two sub-motors 20, 30 operate normally, and the two sub-motors 20, 30 drive the shaft to output a normal operation torque of the brushless DC motor 10. In this case, the sub-motor 20 and the sub-motor 30 each output half of the torque of the brushless DC motor 10. In a scenario that one of the sub-motors fails, the controller 40 cuts off power to the faulty sub-motor immediately and operates the normal sub-motor in the emergency operating mode so that the normal sub-motor outputs a torque in the emergency mode to compensate for an abnormal torque output from the faulty sub-motor, and thus a smooth and positive resultant torque is obtained.

Generally, a fault in the brushless DC motor would be either a controller fault or a motor fault. A controller fault includes a fault in which a switching element is switched off, a fault in which the switching element is shorted, a pre-driver fault, a microprocessor fault and the like. A motor fault includes a fault in which a circuit or winding inside the motor is opened or shorted. The fault in which the switching element is shorted and the fault in which the circuit inside the motor is shorted may result in an abnormal torque output from the faulty sub-motor, which is a braking torque. A short circuited winding, for example, acts as a brake to restrict rotation of the rotor. Hence, these faults are analyzed as follows.

Figure 3:
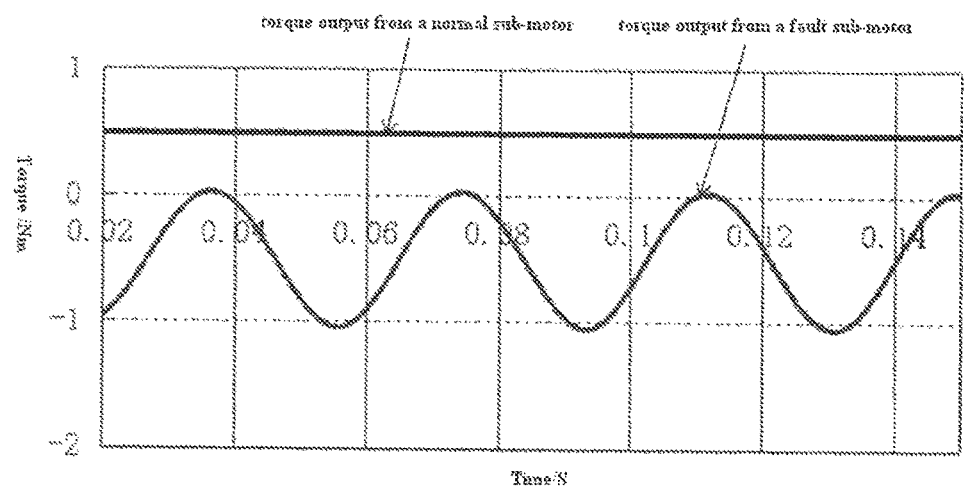
FIG. 3 shows torque waveforms of two sub-motors of the brushless DC motor in the situation that the brushless DC motor has the fault as shown in FIG. 2.

FIG. 2 shows the scenario in which two phase windings of the first sub-motor 20 are shorted, for example, 'a' phase winding and 'b' phase winding are shorted. FIG. 3 shows a torque output from the first sub-motor 20 and a torque output from the second sub-motor 30, where the first sub-motor 20 has the fault. As shown in FIG. 3, the first sub-motor 20 outputs a negative and oscillating torque, and the second sub-motor 30 outputs a positive and smooth torque in the normal operating mode. An amplitude of the torque of the first sub-motor 20 is greater than an amplitude of the torque of the second sub-motor 30. Hence, the waveform of the resultant combined torque of first sub-motor 20 and the second sub-motor 30 must be in a shape of positive-negative alternating oscillation, which is unacceptable in some application fields. In the electric power steering system, the driver would have great difficulty to control the steering wheel due to the varying output torque, and thus it is likely to cause an accident.

It is to be noted that states of the output torques of the motors are discussed only from a macroscopic view in the present description. A waveform of a torque output from a motor operating normally is smooth and straight as the normal or default condition, that is, the torque output from the motor operating normally is a constant value from a macroscopic view.

Figure 4:
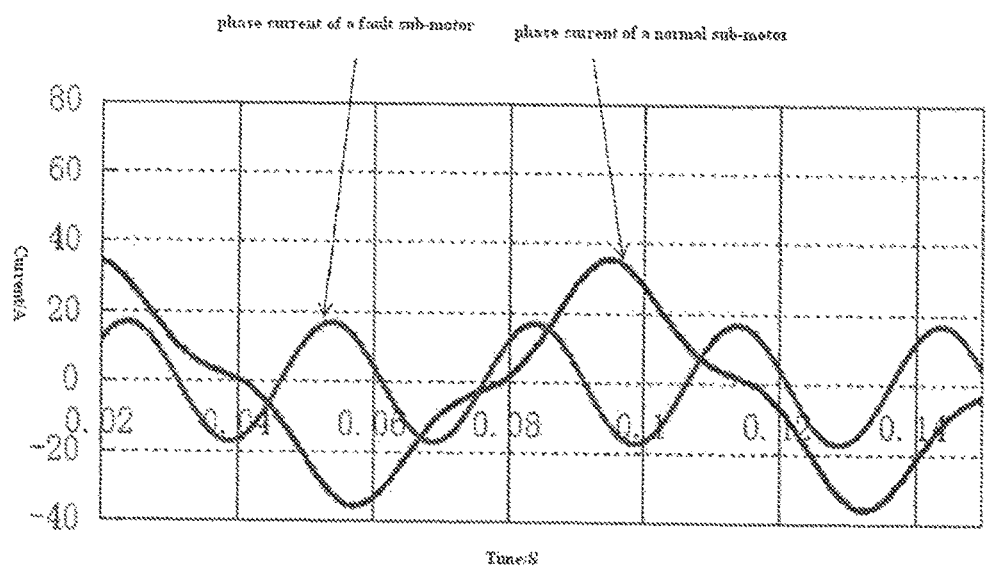
FIG. 4 shows phase current waveforms of two sub-motors after the brushless DC motor according to the present invention has the fault as shown in FIG. 2 and a second sub-motor starts operating in an emergency operating mode.
Figure 5:
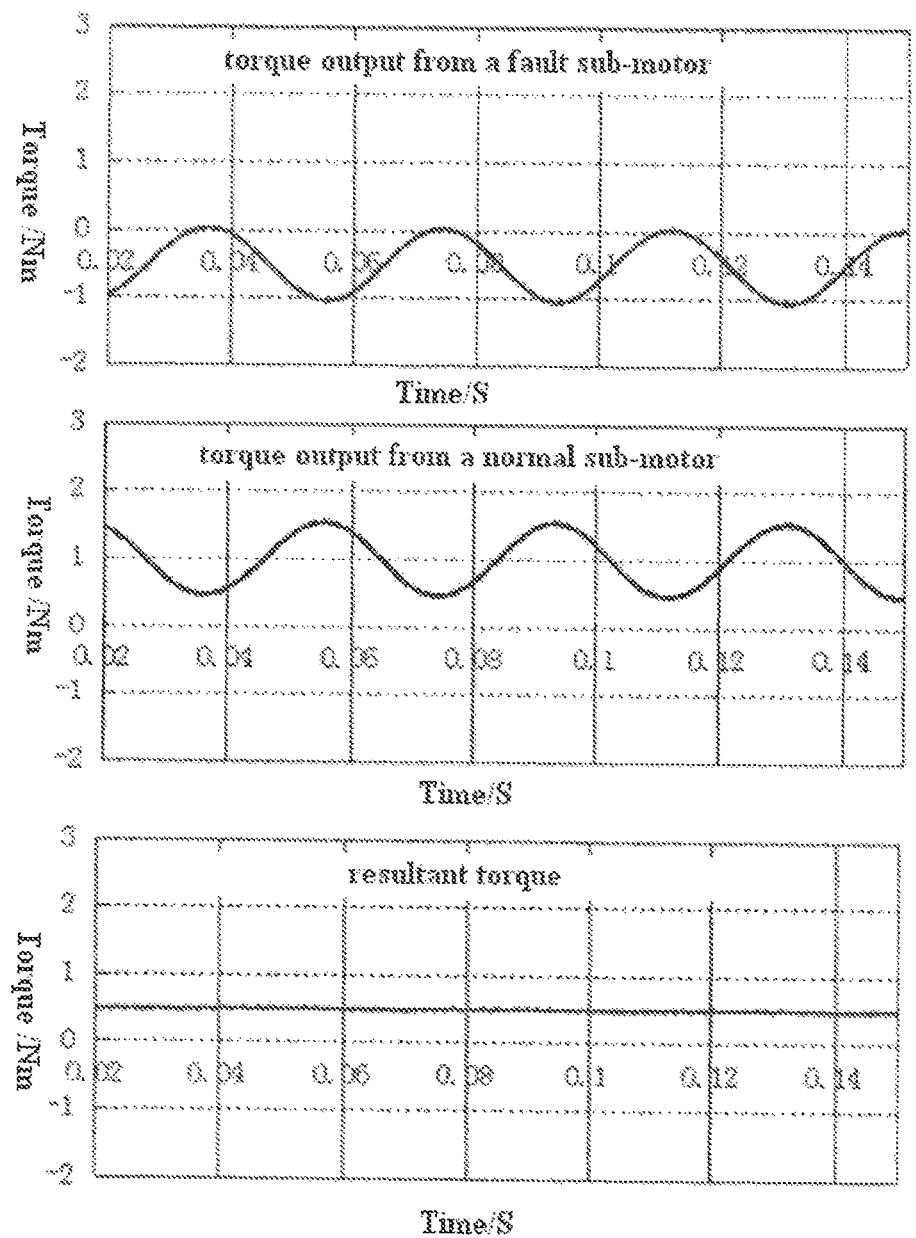
FIG. 5 shows torque waveforms and a resultant torque waveform of two sub-motors after the brushless DC motor according to the present invention has the fault as shown in FIG. 2 and the second sub-motor starts operating in an emergency operating mode.

Referring to FIGS. 4 and 5, in the scenario that the first sub-motor 20 has the above-described fault, the following technical solution is provided according to the present invention. Firstly, power to the faulty sub-motor is cut off by the controller and the normal sub-motor starts operating in the emergency operating mode. A phase current in a particular waveform is provided to the normal sub-motor, and the waveform of the phase current is different from the waveform of the phase current of the normal sub-motor in the normal operating mode. It can be seen from FIG. 5 that the normal sub-motor outputs a pulsating and positive torque in the emergency mode, and an amplitude of the torque is greater than an amplitude of the negative torque output from the faulty sub-motor. Therefore, the torque output from the normal sub-motor can compensate for the abnormal torque generated by the faulty sub-motor and a smooth and positive resultant torque is obtained. In the electric power steering system, in this situation, the brushless DC motor outputs the resultant torque as shown in FIG. 5, the electric power steering system still has an auxiliary power function and the driver can safely drive the vehicle to a safe place or a service location, thereby avoiding an accident.

A current $i_q$ provided by the controller 40 to the normal sub-motor in the emergency mode is obtained according to a formula $i_q = -T/K_t$, where T is a torque output from the faulty sub-motor, and $K_t$ is a torque constant of the normal sub-motor. The torque T provided by the faulty sub-motor is obtained according to the following formula:

$$\begin{cases} (L_a + L_b)\dfrac{di}{dt} + (R_a + R_b)i = e_b - e_a \\ T = \dfrac{e_a i_a + e_b i_b + e_c i_c}{\omega} = \dfrac{e_a - e_b}{\omega}i \end{cases}.$$

In the above-described formula, $L_a$ and $L_b$ represent inductances of shorted two phase windings of the faulty sub-motor respectively; $R_a$ and $R_b$ represent resistances of shorted two phase windings of the faulty sub-motor respectively; $e_a$ and $e_b$ represent counter electromotive forces of shorted two phase windings of the faulty sub-motor respectively; $i_a$, $i_b$ and $i_c$ represent phase currents of the faulty sub-motor respectively; and $\omega$ represents a rotating speed of the faulty sub-motor. The rotating speed of the faulty sub-motor is equal to a rotating speed of the normal sub-motor since a shaft of the rotor is shared by the first sub-motor and the second sub-motor in the present invention.

Figure 7:
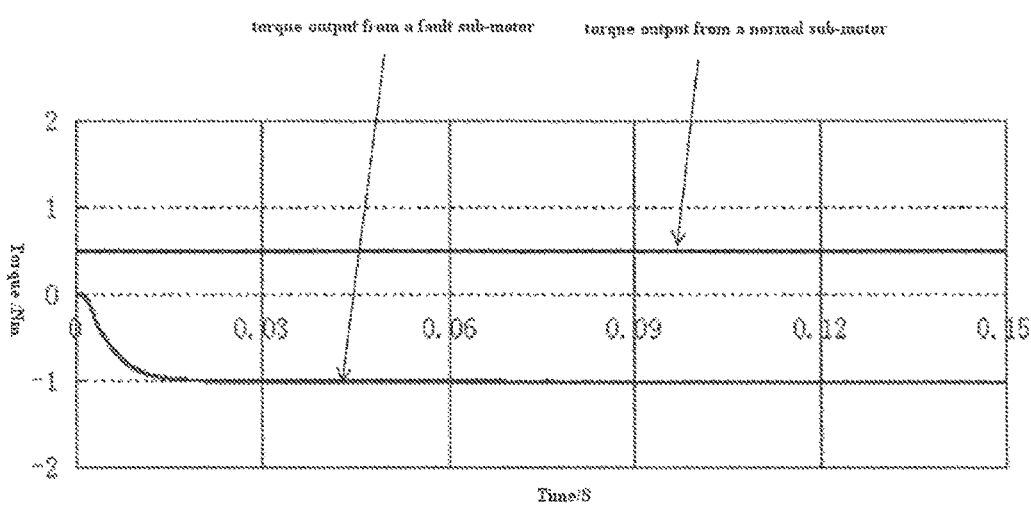
FIG. 7 shows torque waveforms of two sub-motors in a situation that the brushless DC motor has the fault as shown in FIG. 6.

FIG. 6 shows a scenario in which all three phase windings of a first sub-motor 20 are shorted. FIG. 7 shows a torque output from the first sub-motor 20 and a torque output from the second sub-motor 30 when the first sub-motor 20 has a fault. As shown in FIG. 7, the first sub-motor 20 outputs a negative torque which is a braking torque, and the second sub-motor 30 outputs a smooth and positive torque in the normal operating mode. The resultant combined torque of the first sub-motor 20 and the second sub-motor 30 is negative since an amplitude of the torque output from the first sub-motor 20 is greater than an amplitude of the torque output from the second sub-motor 30. In this example, in the electric power steering system, the brushless DC motor generates a braking torque for the steering wheel, a steering torque applied by the driver to the steering wheel is much less than the braking torque, and thus the driver cannot turn the steering wheel, which may result in an accident.

Figure 8:
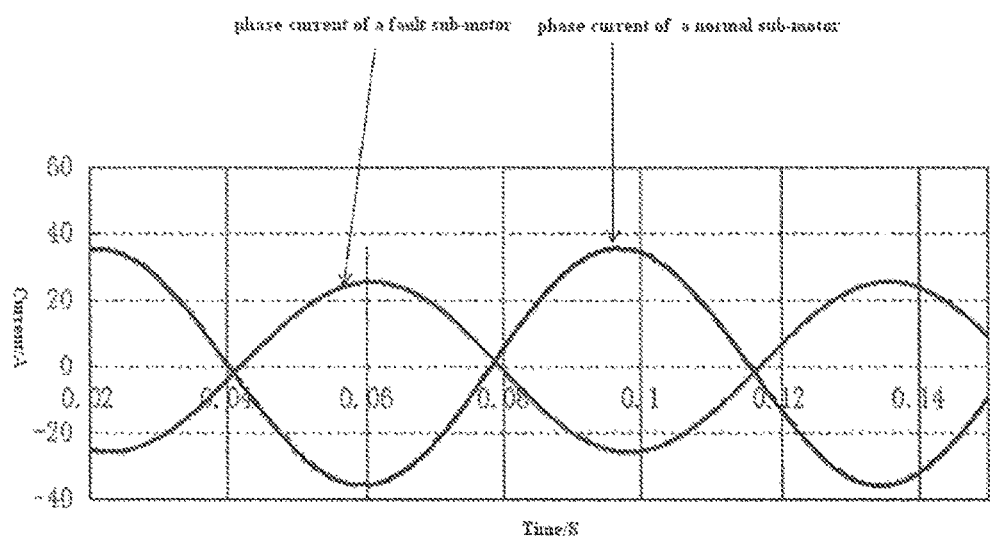
FIG. 8 shows phase current waveforms of two sub-motors after the brushless DC motor according to the present invention has the fault as shown in FIG. 6 and the second sub-motor starts operating in an emergency operating mode.
Figure 9:
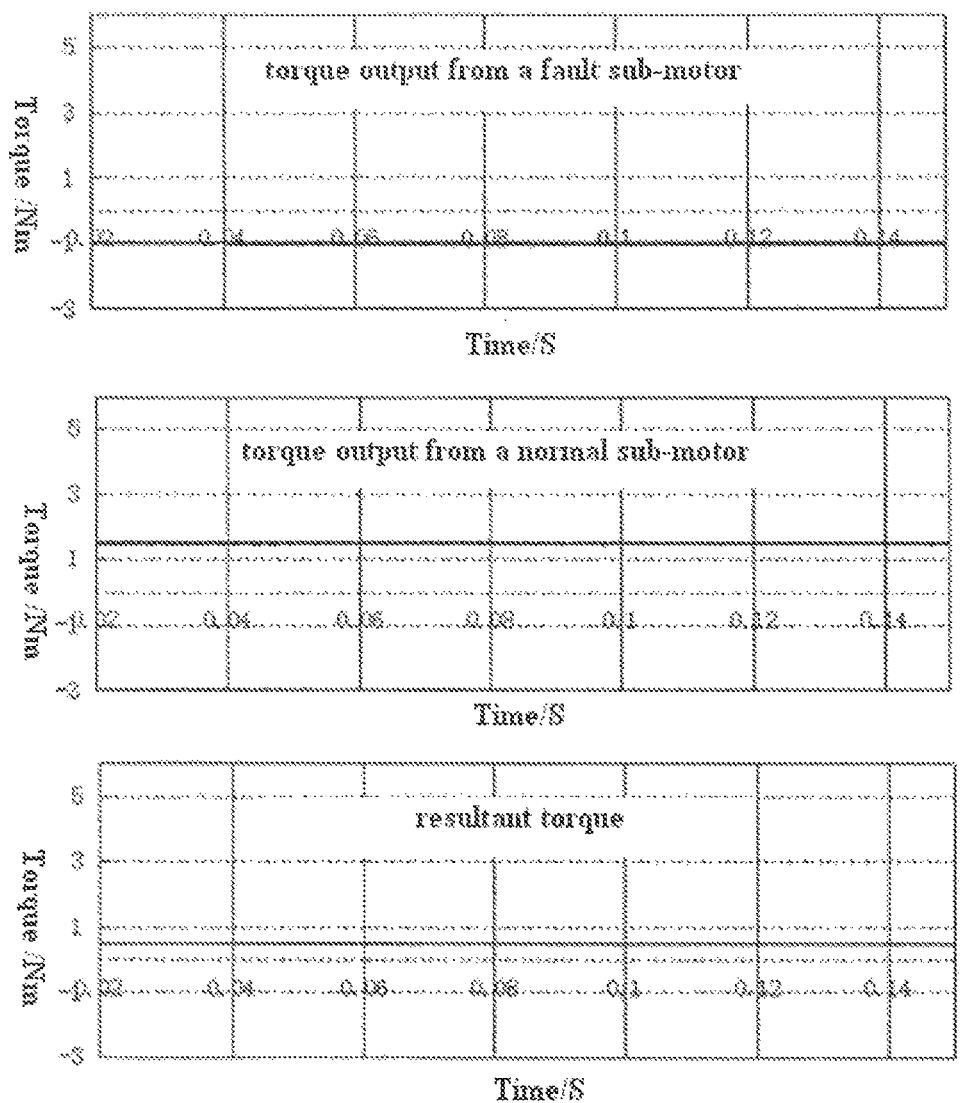
FIG. 9 shows torque waveforms and a resultant torque waveform of two sub-motors after the brushless DC motor according to the present invention has the fault as shown in FIG. 6 and the second sub-motor starts operating in an emergency operating mode.

Referring to FIG. 8 and FIG. 9, in the scenario that the first sub-motor 20 has the above-described fault, the following technical solution is provided according to the present invention. Power to the faulty sub-motor is cut off by the controller and the normal sub-motor starts operating in the emergency operating mode. A phase current in a particular waveform is provided to the normal sub-motor and the waveform of the phase current is different from the waveform of a phase current of the normal sub-motor when operating in the normal operating mode. It can be seen from FIG. 9 that the normal sub-motor outputs a smooth and positive torque in the emergency mode and an amplitude of the torque is greater than an amplitude of a negative torque outputted from the faulty sub-motor. Therefore, the torque output from the normal sub-motor can compensate for an abnormal torque generated by the faulty sub-motor and a smooth and positive resultant torque is obtained. In the electric power steering system, when the brushless DC motor outputs the resultant torque as shown in FIG. 9, the electric power steering system still has an auxiliary power function, and the driver can reasonably drive the vehicle to a safe place or to a service location in order to repair the faulty sub-motor.

A current $i_q$ provided by the controller 40 to the normal sub-motor in the emergency mode is obtained according to a formula $i_q = -T/K_t$, where T is a torque output from the faulty sub-motor, and $K_t$ is a torque constant of the normal sub-motor. The torque T output from the faulty sub-motor is obtained according to the following formula:

$$\begin{cases} (L_a + L_b)\dfrac{di_1}{dt} + (R_a + R_b)i_1 = e_b - e_a \\ (L_c + L_b)\dfrac{di_2}{dt} + (R_c + R_b)i_2 = e_b - e_c \\ (L_a + L_c)\dfrac{di_3}{dt} + (R_a + R_c)i_3 = e_c - e_a \\ T = \dfrac{e_a i_a + e_b i_b + e_c i_c}{\omega} = \dfrac{e_a(i_1 + i_3) - e_b(i_1 + i_2) + e_c(i_3 - i_2)}{\omega} \end{cases}.$$

In the above-described formula, $L_a$, $L_b$ and $L_c$ represent inductances of phase windings of the faulty sub-motor respectively; $R_a$, $R_b$ and $R_c$ represent resistances of phase windings of the faulty sub-motor respectively; $e_a$, $e_b$ and $e_c$ represent counter electromotive forces of phase windings of the faulty sub-motor respectively; $i_a$, $i_b$ and $i_c$ represent phase currents of the faulty sub-motor respectively; and $\omega$ represents a rotating speed of the faulty sub-motor.

Figure 11:
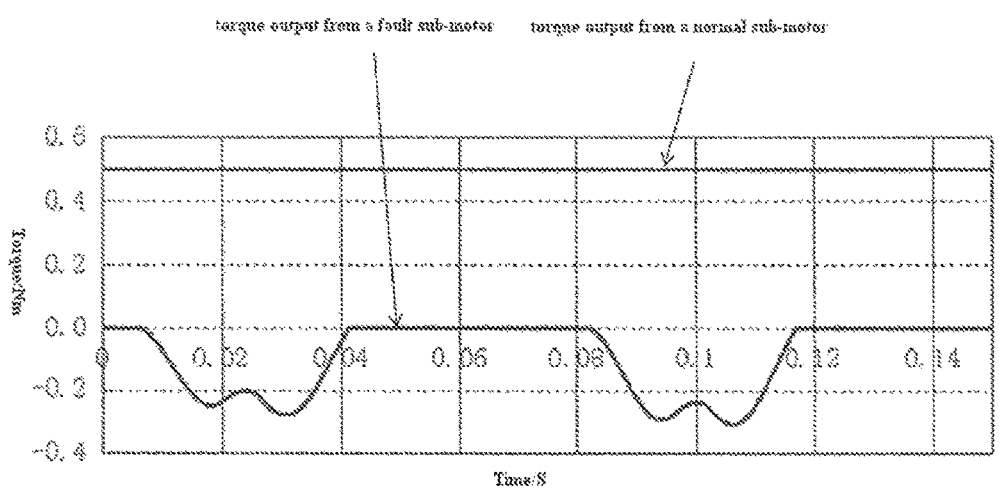
FIG. 11 shows torque waveforms of two sub-motors in the situation that the brushless DC motor has the fault as shown in FIG. 10.

FIG. 10 shows the scenario in which one of the switching elements 51, by which a controller 40 is connected to an input terminal of a first sub-motor 20, is shorted. FIG. 11 shows a torque of the first sub-motor 20 and a torque of the second sub-motor 30 when the first sub-motor has the fault. As shown in FIG. 11, the first sub-motor 20 outputs a negative and oscillating torque, and the second sub-motor 30 outputs a positive and smooth torque in a normal operating mode. The resultant torque of the torque of first sub-motor 20 and the torque of the second sub-motor 30 is positive but oscillating. In this example, the driver cannot control the steering wheel in the electric power steering system.

Figure 12:
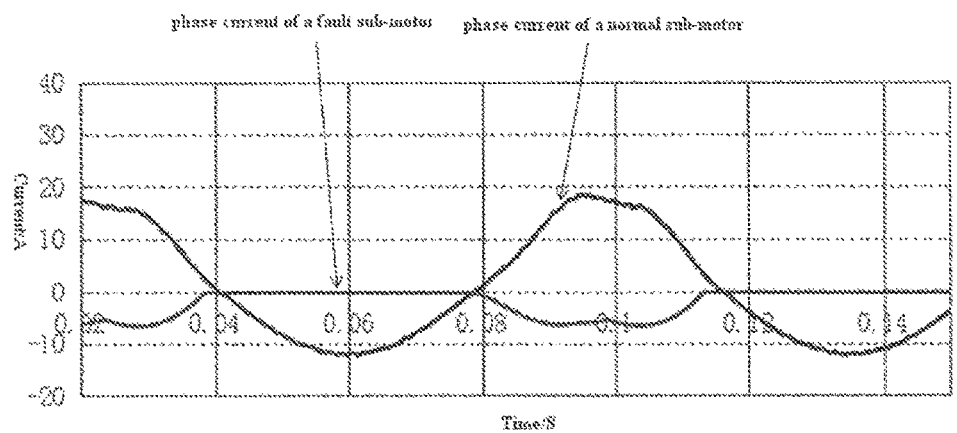
FIG. 12 shows phase current waveforms of two sub-motors after the brushless DC motor according to the present invention has the fault as shown in FIG. 10 and a second sub-motor starts operating in an emergency operating mode.
Figure 13:
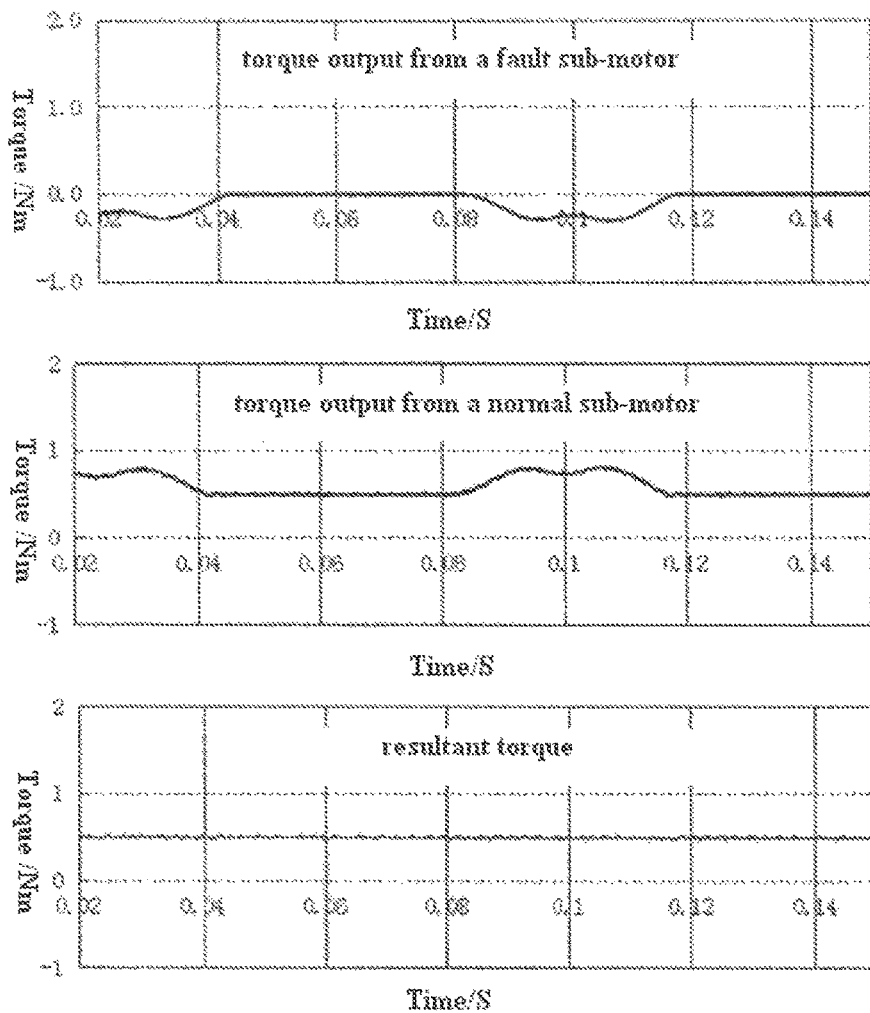
FIG. 13 shows torque waveforms and a resultant torque waveform of two sub-motors after the brushless DC motor according to the present invention has the fault as shown in FIG. 10 and the second sub-motor starts operating in an emergency operating mode.

Referring to FIGS. 12 and 13, when the above-described fault occurs, the following technical solution is provided according to the present invention. Power to the faulty sub-motor is cut off by the controller and the normal sub-motor starts operating in the emergency operating mode, in which a phase current in a particular waveform is provided to the normal sub-motor. The waveform of the phase current in the emergency operating mode is different from the waveform of the phase current of the normal sub-motor in the normal operating mode. It can be seen from FIG. 13 that the torque output from the normal sub-motor in the emergency mode can compensate for an abnormal torque generated by the faulty sub-motor, and a smooth and positive resultant torque is obtained. In the electric power steering system, if the brushless DC motor outputs the resultant torque as shown in FIG. 13, the electric power steering system still has auxiliary power function, and the driver can safely drive the vehicle to a safe place or a service location with the faulty motor.

It is to be noted that, in the embodiment, although the first sub-motor 20 itself has no fault, the first sub-motor 20 is also referred to as the faulty sub-motor since the first sub-motor 20 outputs a negative oscillating torque due to failure of the switching element 51.

A current $i_q$ provided by the controller 40 to the normal sub-motor in the emergency mode is obtained according to a formula $i_q = -T/K_t$, where T is a torque output from the faulty sub-motor, and $K_t$ is a torque constant of the normal sub-motor. The torque T output from the faulty sub-motor is obtained according to the following formula:

$$T = \dfrac{e_a i_a + e_b i_b + e_c i_c}{\omega} = \dfrac{-e_a(i_1 + i_2) + e_b i_1 + e_c i_2}{\omega}.$$

In the above-described formula, $$(L_a + L_b)\frac{di_1}{dt} + (R_a + R_b)i_1 = e_a - e_b$$

if $e_a > e_b$; if $e_a$ and $e_b$ do not meet the above-described relation, $i_1 = 0$.

$$(L_a + L_c)\frac{di_2}{dt} + (R_a + R_c)i_2 = e_a - e_c \text{ if } e_a > e_c;$$

if $e_a$ and $e_c$ do not meet the above-described relation, $i_2 = 0$. Hence, the above-described relation may be shown by the following formula:

$$\begin{cases} \text{if } (e_a > e_b), (L_a + L_b)\frac{di_1}{dt} + (R_a + R_b)i_1 = e_a - e_b; \text{ else, } i_1 = 0 \\ \text{if } (e_a > e_c), (L_a + L_c)\frac{di_2}{dt} + (R_a + R_c)i_2 = e_a - e_c; \text{ else, } i_2 = 0 \end{cases}$$

In the above-described formula, w represents a rotating speed of the faulty sub-motor; $L_a$, $L_b$ and $L_c$ represent inductances of phase windings of the faulty sub-motor respectively; $R_a$, $R_b$ and $R_c$ represent resistances of phase windings of the faulty sub-motor respectively; $e_a$, $e_b$ and $e_c$ represent counter electromotive forces of phase windings of the faulty sub-motor respectively; $i_a$, $i_b$ and $i_c$ represent phase currents of the faulty sub-motor respectively, and $L_a$, $R_a$, $e_a$ and $i_a$ are relevant parameters of a phase winding connected to the shorted switching element.

In the above-described embodiments, the first sub-motor 20 failing is taken as an example. It should be understood that, the second sub-motor 30 may fail, and the first sub-motor 20 starts operating in the emergency operating mode as the normal sub-motor 20.

Figure 14:
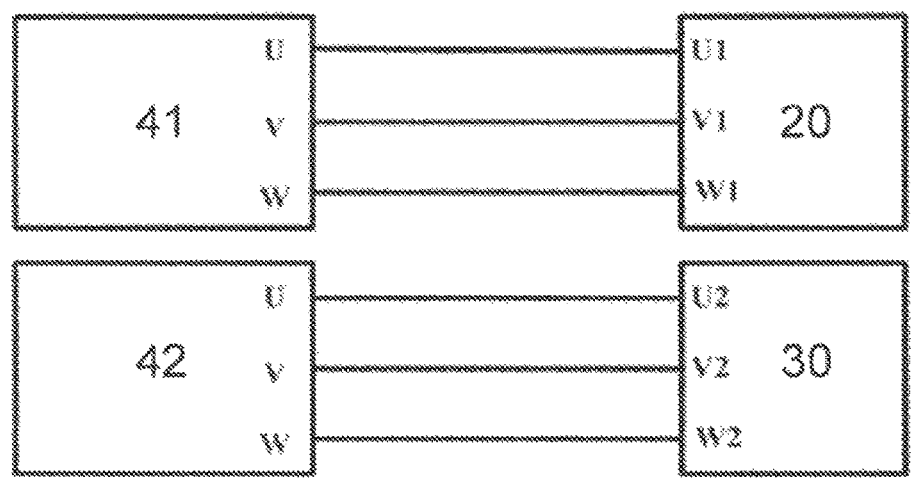
FIG. 14 is a schematic block diagram of a brushless DC motor according to an embodiment of the present invention.

FIG. 14 shows a brushless DC motor according to an embodiment of the present invention. This embodiment differs from the embodiment as shown in FIG. 1 in that two controllers 41, 42 are configured to control the first sub-motor 20 and the second sub-motor 30 respectively.

Figure 15:
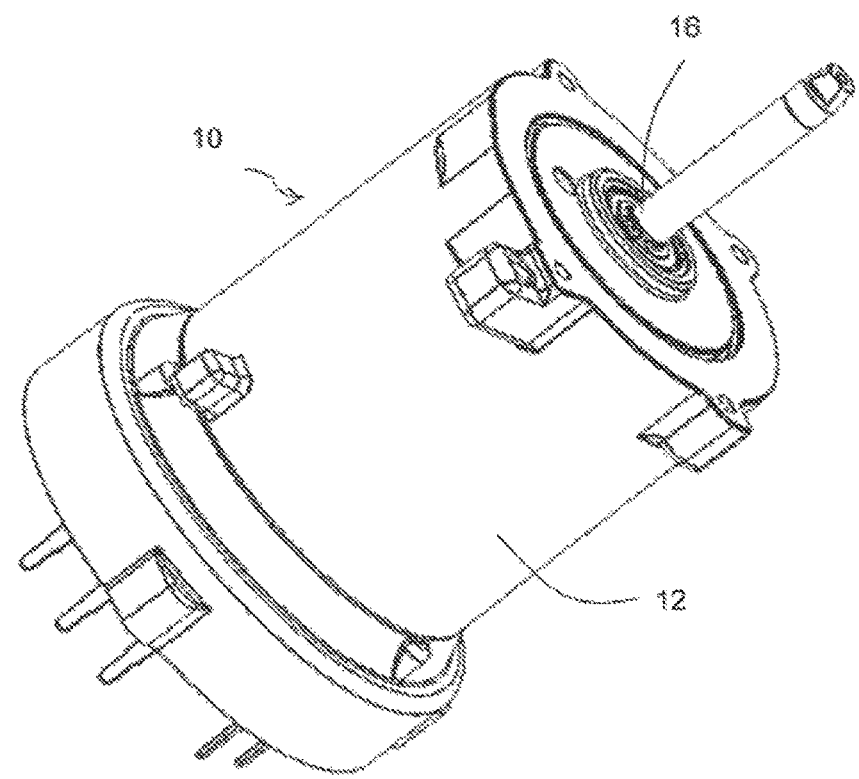
FIG. 15 illustrates a brushless DC motor according to an embodiment of the present invention.
Figure 16:
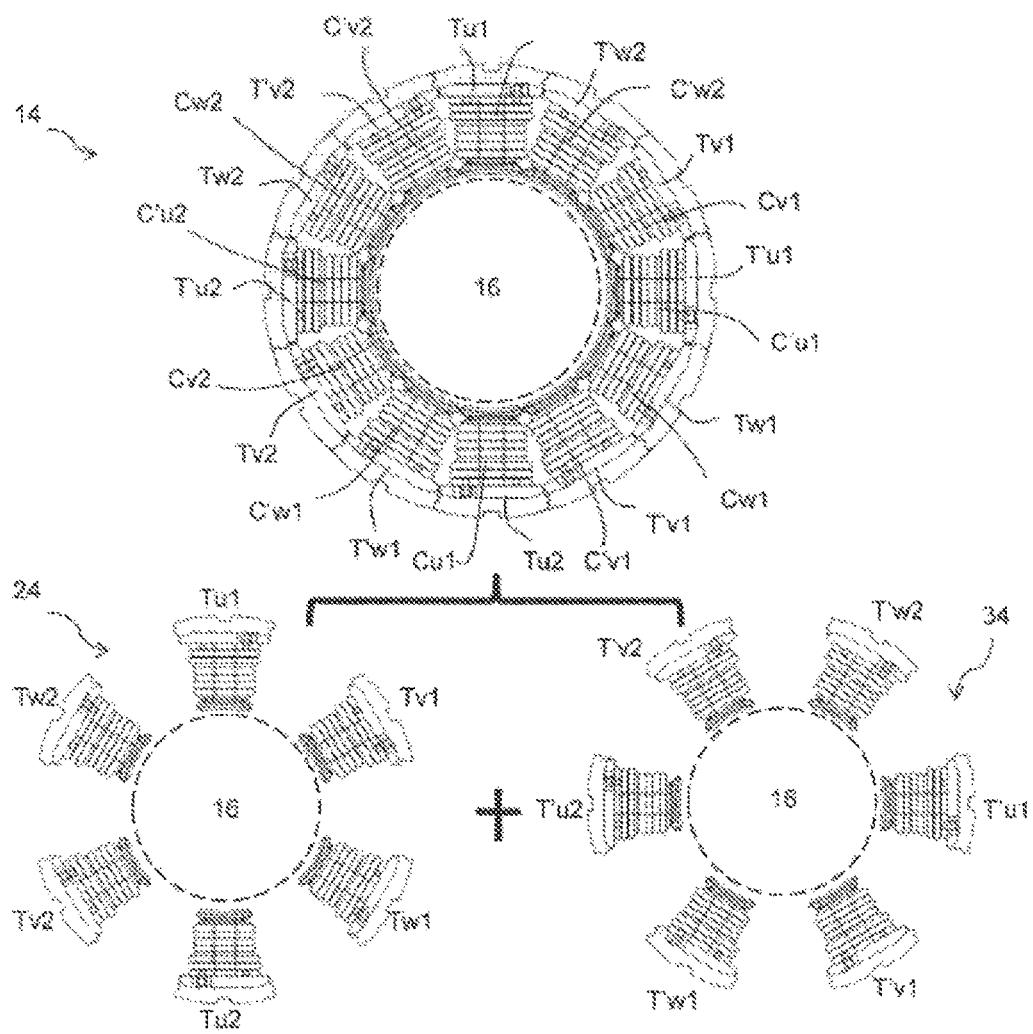
FIG. 16 is a schematic diagram of a stator and a rotor of the brushless DC motor shown in FIG. 15.

FIG. 15 is a view of the assembled motor and FIG. 16 is a schematic structural diagram of a brushless DC motor 10 according to another embodiment of the present invention. The controller is omitted in FIGS. 15 and 16. The brushless DC motor 10 includes a shell or housing 12, a stator 14 and a rotor 16 accommodated inside the shell 12. The rotor 16 is shared by the first sub-motor 20 and the second sub-motor 30, or at least a shaft of the rotor is shared. The stator 14 includes a stator 24 of the first sub-motor 20 and a stator 34 of the second sub-motor 30. The stator 24 and the stator 34 include several teeth and several windings wound on the teeth. The teeth of the stator 24 and the teeth of the stator 34 are staggered in a circumferential direction.

The teeth and the windings of the stator 24 include U phase teeth, V phase teeth and W phase teeth and U phase windings, V phase windings and W phase windings. Specifically, the stator 24 includes U phase teeth Tu1 and Tu2, V phase teeth Tv1 and Tv2, and W phase teeth Tw1 and Tw2, and corresponding U phase windings Cu1 and Cu2, V phase windings Cv1 and Cv2, and W phase windings Cw1 and Cw2. Similarly, the teeth and the windings of the stator 34 include U phase teeth, V phase teeth and W phase teeth and U phase windings, V phase windings and W phase windings. Specifically, the stator 34 includes U phase teeth T'u1 and T'u2, V phase teeth T'v1 and T'v2, and W phase teeth T'w1 and T'w2, and corresponding U phase windings C'u1 and C'u2, V phase windings C'v1 and C'v2, and W phase windings C'w1 and C'w2.

The teeth in the same phase in the stator 24 of the first sub-motor 20 are symmetrically distributed by 180 degrees. The teeth in the same phase in the stator 34 of the second sub-motor 30 are symmetrically distributed by 180 degrees. The teeth of the stator 24 and the teeth of the stator 34 are arranged alternately with a single tooth, that is, each tooth of the stator 24 is located between two adjacent teeth of the stator 34, and each tooth of the stator 34 is located between two adjacent teeth of the stator 24. As an alternative solution, the teeth of the stator 24 and the stator 34 may be arranged alternately with double teeth or be arranged alternately in other angular intervals.

Figure 17:
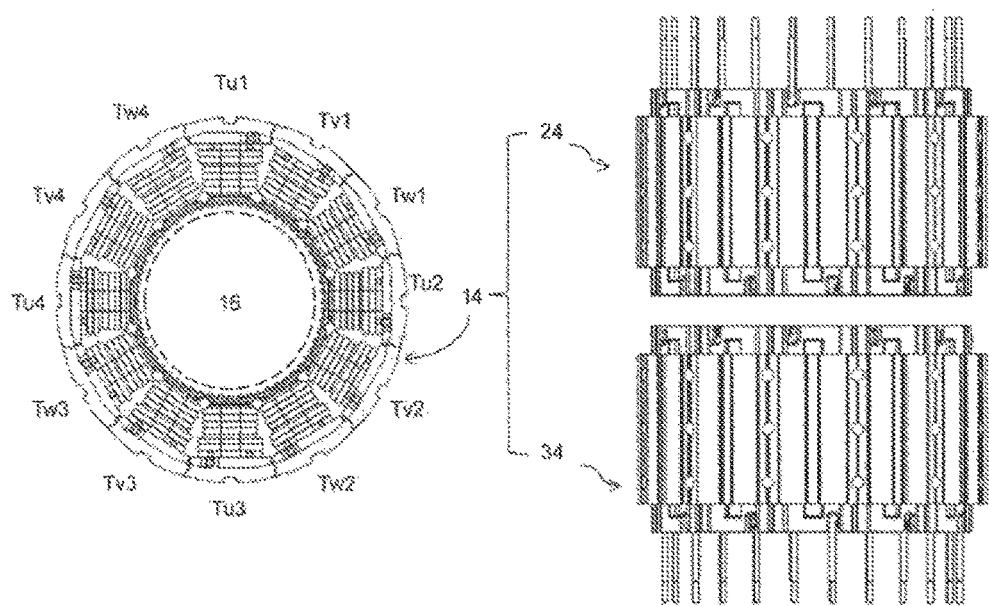
FIG. 17 is a schematic diagram of a stator and a rotor of a brushless DC motor according to an embodiment of the present invention.

As show in FIG. 17, as an alternate solution, the stator 24 and the stator 34 are arranged in parallel in an axial direction. The stator 24 includes twelve teeth Tu1 to Tu4, Tv1 to Tv4, Tw1 to Tw4 and twelve windings wound on the teeth respectively. The stator 34 also includes twelve teeth T'u1 to T'u4, T'v1 to T'v4, T'w1 to T'w4 and twelve windings wound on the teeth respectively.

In the two above-described embodiments, the shell 12 and the rotor 16 are shared by the stator 24 and the stator 34. Hence, the volume of the brushless DC motor according to the present invention is not increased significantly.

Figure 18:
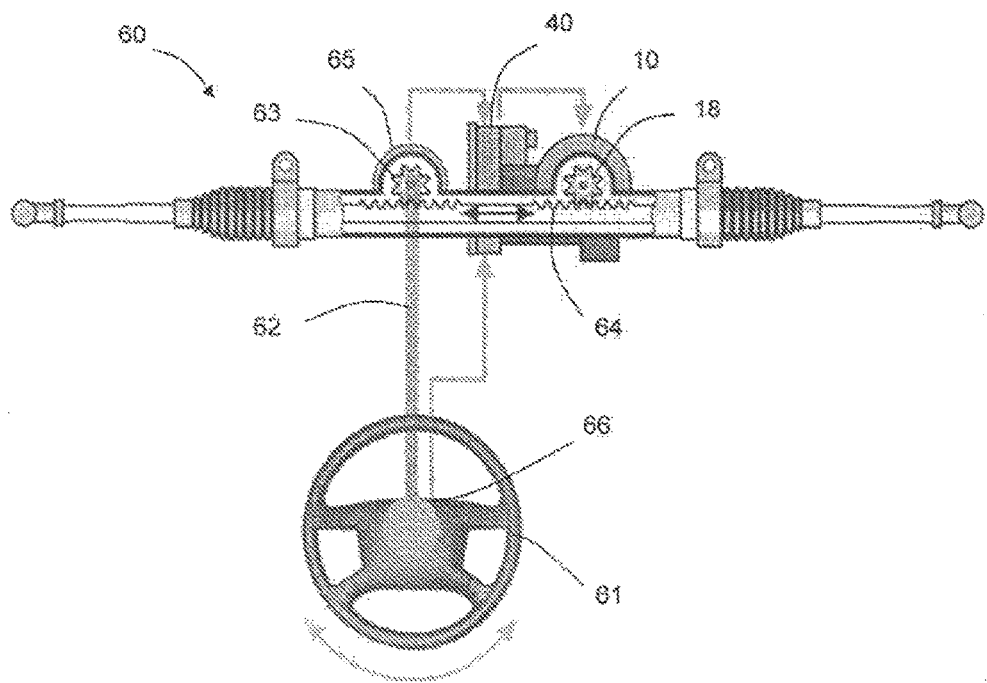
FIG. 18 is a schematic diagram of an electric power steering system using a brushless DC motor according to the present invention.

FIG. 18 is a schematic diagram of an electric power steering system 60 using the brushless DC motor 10 according to the present invention. The electric power steering system 60 includes a steering wheel 61, a steering column 62 fixedly connected to the steering wheel 61, and a steering gear 63 coaxially fixed to the steering column. A shaft of the motor 10 is drivingly connected to a drive gear 18 to output a torque of the motor 10. The drive gear 18 is drivingly connected to the steering gear 63 via a steering rack 64. When the motor 10 operates, the drive gear 18 rotates the steering gear 63 via the steering rack 64, thus rotating the steering column 62 and the steering wheel 61, to assist the driver to control the steering wheel 61. The electric power steering system 60 further includes a steering torque sensor 65 and a steering wheel angle sensor 66 configured to generate signals such as a torque and a steering direction of the steering wheel 61 and transmit the signals to the controller 40. The controller 40 sends a corresponding instruction to the motor 10 based on the signals so that the motor 10 outputs a steering power torque in a corresponding amplitude and direction, and thus an auxiliary power is generated. In practice, a reduction gear may further be provided between the motor 10 and the drive gear 16 to increase an output torque.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A BLDC motor, comprising:
a first sub-motor and a second sub-motor,
wherein the first sub-motor and the second sub-motor have independent input terminals and a common output shaft, a normal operating mode and an emergency operating mode are set for the first sub-motor and the second sub-motor;
in the normal operating mode, the two sub-motors operate together as one motor to output a normal operating power of the brushless DC motor; and
a normal sub-motor starts operating in the emergency operating mode when one of the two sub-motors becomes faulty and generates a braking torque, and a phase current waveform of the normal sub-motor in the emergency operating mode is different from a phase current waveform of the normal sub-motor in the normal operating mode.

2. The motor of claim 1, wherein a torque output from the normal sub-motor in the emergency operating mode compensates for the braking torque generated by the faulty sub-motor, and a positive and smooth resultant torque is obtained.

3. The motor of claim 2, wherein a phase current $i_q$ of the normal sub-motor is obtained according to the formula $i_q = -T/K_t$, wherein T is a torque output from the faulty sub-motor, and $K_t$ is a torque constant of the normal sub-motor.

4. The motor of claim 3, wherein the first sub-motor and the second sub-motor are three-phase motors, and the fault is a fault in which two phase windings are shorted.

5. The motor of claim 4, wherein the torque T output from the faulty sub-motor is obtained according to the following formula:

$$\begin{cases} (L_a + L_b)\frac{di}{dt} + (R_a + R_b)i = e_b - e_a \\ T = \frac{e_a i_a + e_b i_b + e_c i_c}{\omega} = \frac{e_a - e_b}{\omega}i \end{cases}.$$

6. The motor of claim 3, wherein the first sub-motor and the second sub-motor are three-phase motors, and the fault is a fault in which three phase windings are shorted.

7. The motor of claim 6, wherein the torque T output from the faulty sub-motor is obtained according to the following formula:

$$\begin{cases} (L_a + L_b)\frac{di_1}{dt} + (R_a + R_b)i_1 = e_b - e_a \\ (L_c + L_b)\frac{di_2}{dt} + (R_c + R_b)i_2 = e_b - e_c \\ (L_a + L_c)\frac{di_3}{dt} + (R_a + R_c)i_3 = e_c - e_a \\ T = \frac{e_a i_a + e_b i_b + e_c i_c}{\omega} = \frac{e_a(i_1 + i_3) - e_b(i_1 + i_2) + e_c(i_3 - i_2)}{\omega} \end{cases}.$$

8. The motor of claim 3, further comprising: at least one controller, wherein the controller is connected to input terminals of the first sub-motor and the second sub-motor via switching elements, and the fault is a fault in which at least one of the switching elements is shorted.

9. The motor of claim 8, wherein the torque T output from the faulty sub-motor is obtained according to the following formula:

$$T = \frac{e_a i_a + e_b i_b + e_c i_c}{\omega} = \frac{-e_a(i_1 + i_2) + e_b i_1 + e_c i_2}{\omega}, \text{ wherein}$$

$$\begin{cases} \text{if } (e_a > e_b), (L_a + L_b)\frac{di_1}{dt} + (R_a + R_b)i_1 = e_a - e_b; \text{ else, } i_1 = 0 \\ \text{if } (e_a > e_c), (L_a + L_c)\frac{di_2}{dt} + (R_a + R_c)i_2 = e_a - e_c; \text{ else, } i_2 = 0 \end{cases}.$$

10. The motor of claim 1, wherein the first sub-motor and the second sub-motor each comprise several teeth and windings, and the teeth of the first sub-motor and the teeth of the second sub-motor are staggered in a circumferential direction.

11. The motor of claim 10, wherein the teeth of the first sub-motor and the teeth of the second sub-motor are uniformly staggered in a circumferential direction.

12. The motor of claim 10, wherein the number of stator slots of the brushless DC motor is twelve, the first sub-motor and the second sub-motor each comprise six teeth, the six teeth comprises two U phase teeth, two V phase teeth and two W phase teeth, and two teeth in the same phase are symmetrically distributed by 180 degrees.

13. The motor of claim 1, wherein the first sub-motor and the second sub-motor each comprise several teeth and windings, and the teeth of the first sub-motor and the teeth of the second sub-motor are arranged in parallel in an axial direction.

14. An electric power steering system, comprising: a steering wheel, a steering column fixedly connected to the steering wheel, a steering gear fixedly connected to the steering column, and a motor drivingly connected to the steering gear, wherein the motor is the BLDC motor of claim 1.

15. A method of controlling a BLDC motor, wherein the BLDC motor comprises a first sub-motor and a second sub-motor, the first sub-motor and the second sub-motor have independent input terminals and a common output shaft, the method comprises the steps of:
setting the first sub-motor and the second sub-motor to be capable of operating together as one motor, or operating independently;
setting a normal operating mode for the first sub-motor and the second sub-motor, wherein the two sub-motors operate together as one motor to output a normal operation torque of the brushless DC motor in the normal operating mode; and
setting an emergency operating mode for the first sub-motor and the second sub-motor, wherein a normal sub-motor starts operating in the emergency operating mode when one of the two sub-motors becomes faulty and generates a braking torque, a phase current waveform of the normal sub-motor in the emergency operating mode is different from a phase current waveform of the normal sub-motor in the normal operating mode, and a torque output from the normal sub-motor in the emergency operating mode compensates for the braking torque generated by the faulty sub-motor.

16. The method of claim 15, wherein a positive and smooth torque waveform is generated from the torque output from the normal sub-motor and the torque output from the faulty sub-motor.

17. The method of claim 15, wherein a phase current $i_q$ of the normal sub-motor is obtained according to the formula $i_q = -T/K_t$, wherein T is a torque output from the faulty sub-motor, and $K_t$ is a torque constant of the normal sub-motor.

18. The method of claim 17, wherein the first sub-motor and the second sub-motor are three-phase motors, and the fault is a fault in which two phase windings of the faulty sub-motor are shorted, and the torque T output from the faulty sub-motor is obtained according to the following formula:

$$\begin{cases} (L_a + L_b)\frac{di}{dt} + (R_a + R_b)i = e_b - e_a \\ T = \frac{e_a i_a + e_b i_b + e_c i_c}{\omega} = \frac{e_a - e_b}{\omega} i \end{cases}.$$

19. The method of claim 17, wherein the first sub-motor and the second sub-motor are three-phase motors, and the fault is a fault in which the three phase windings of the faulty sub-motor are shorted, and the torque T output from the faulty sub-motor is obtained according to the following formula:

$$\begin{cases} (L_a + L_b)\frac{di_1}{dt} + (R_a + R_b)i_1 = e_b - e_a \\ (L_c + L_b)\frac{di_2}{dt} + (R_c + R_b)i_2 = e_b - e_c \\ (L_a + L_c)\frac{di_3}{dt} + (R_a + R_c)i_3 = e_c - e_a \\ T = \frac{e_a i_a + e_b i_b + e_c i_c}{\omega} = \frac{e_a(i_1 + i_3) - e_b(i_1 + i_2) + e_c(i_3 - i_2)}{\omega} \end{cases}.$$

20. The method of claim 17, wherein at least one controller is provided, and the at least one controller is connected to input terminals of the first sub-motor and the second sub-motor via switching elements, the fault is a fault in which at least one of the switching elements is shorted, and the torque T output from the faulty sub-motor is obtained according to the following formula:

$$T = \frac{e_a i_a + e_b i_b + e_c i_c}{\omega} = \frac{-e_a(i_1 + i_2) + e_b i_1 + e_c i_2}{\omega}, \text{ wherein}$$

$$\begin{cases} \text{if } (e_a > e_b), (L_a + L_b)\frac{di_1}{dt} + (R_a + R_b)i_1 = e_a - e_b; \text{ else, } i_1 = 0 \\ \text{if } (e_a > e_c), (L_a + L_c)\frac{di_2}{dt} + (R_a + R_c)i_2 = e_a - e_c; \text{ else, } i_2 = 0 \end{cases}.$$

* * * * *